Sept. 18, 1962  K. VON KESSEL ET AL  3,054,727
PROCESS FOR PURIFICATION OF BENZENE
Filed June 7, 1960
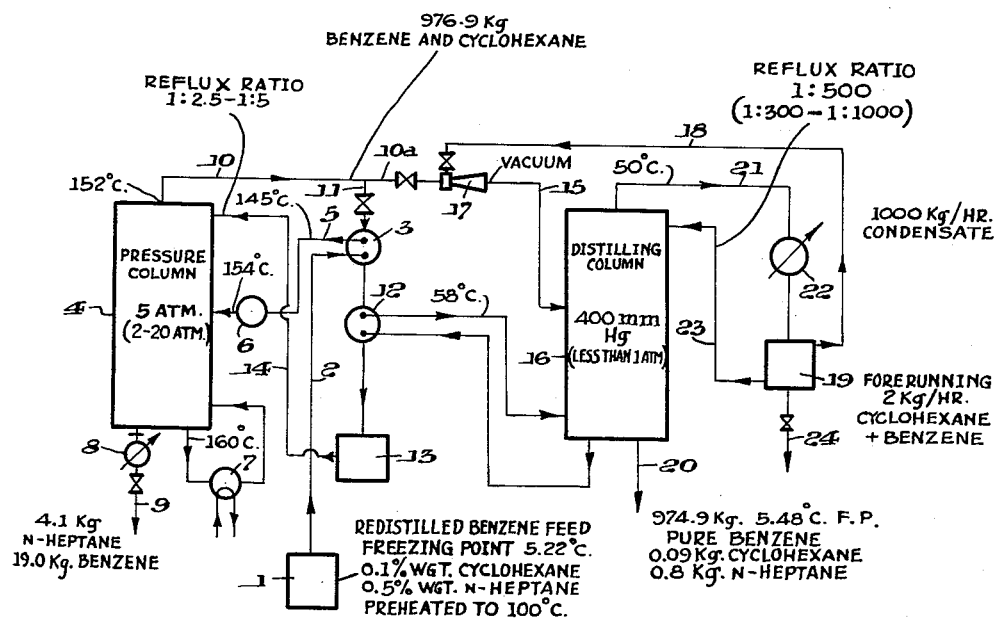
INVENTORS.
KURT VON KESSEL,
KLAUS DIERSCHKE.
BY Thomas J. P. O'Brien
their ATTORNEY 3,054,727
PROCESS FOR PURIFICATION OF BENZENE
Kurt von Kessel, Essen-Steele, and Klaus Dierschke, Essen, Germany, assignors, by mesne assignments, to Koppers Company, Inc., Pittsburgh, Pa., a corporation of Delaware
Filed June 7, 1960, Ser. No. 34,573
2 Claims. (Cl. 202—51)

The present invention relates to a process for purification of benzene which contains non-aromatic hydrocarbons, especially n-heptane and cyclohexane, as impurities by a distillation process.

The manufacture of benzene of high purity, for example benzene with a melting point above 5.4° C., requires a high expenditure for energy and apparatus. The starting product—a pre-purified mixture of benzene, toluene, and xylene—is usually first separated into the individual fractions, benzene, toluene, and xylene, in a distillation column operating with a very high reflux ratio, for example 1:900; a forerunnings which contains particularly the lower boiling impurities is simultaneously separated. The benzene fraction recovered in this manner is then again purified, for example by azeotropic distillation or by an extraction process. A treatment of the benzene by a normal-pressure distillation does not lead to the desired degree of purity.

An azeotropic distillation and also an extraction generally require a considerable additional expenditure for energy.

It has now been found that it is possible to purify the benzene to a melting point above 5.4° C. with a very simple apparatus and with a considerable reduction of the energy costs when the separation, especially that of the heptane from the benzene, is conducted under increased pressure.

Accordingly, the process of the invention consists in separating the starting material in a distillation column at an excess pressure of 2 to 20 atmospheres into a tail or sump product which contains the main amount of n-heptane in addition to a small amount of benzene and into an upper product, such as a side stream or head product which contains the main amount of benzene and cyclohexane.

The basis for the operating method conforming to the invention is essentially that an enrichment of the components in the head product of the distillation which possesses the higher molecular heat of vaporization occurs with increasing pressure. In the present case benzene has the higher molecular heat of vaporization in comparison to the n-heptane. Therefore, it is possible to achieve a substantial separation of the difficultly boiling impurity, n-heptane, in the column operating under increased pressure so that a substantially pure benzene which is suitable for many applications without additional treatment is recovered.

The expenditure of energy which is necessary for the operating method of the invention and which consists principally in the consumption of steam for heating the pressure column can be completely defrayed since now the separation of the original mixture of benzene, toluene and xylene into the individual fractions need no longer be carried out with a reflux ratio of about 1:900 but only with a reflux ratio of about 1:50, since the process of the invention is able to process even a less highly pre-purified benzene to very pure benzene.

As mentioned, the pressure in the pressure column can be between 2 and 20 atmospheres. The actually used pressure depends primarily on the proportion of non-aromatic impurities of the starting material in relation to one another and in relation to the benzene. A satisfactory enrichment of the n-heptane in the sump is generally not able to be achieved at pressures below 2 atmospheres. Higher pressures than about 20 atmospheres do not result in such an improvement of the separation of the starting material that the increased expenditure for operating and construction costs would be justified. In the case of benzenes which are usually considered for the treatment according to the process of the invention, the most favorable pressure range is between about 5 and 10 atmospheres. In the case of an excess pressure of about 5 atmospheres it is advantageous to use a head temperature of the pressure column which amounts to about 150° C. and a sump temperature which amounts to about 160° C.

The additional purification of the product containing the main amount of benzene and leaving the pressure column in vaporous form can be effected in various ways, depending on the quality requirements of the final pure benzene. If a subsequent treatment is at all necessary, this can be done, for example, by branching off two fractions of vapors from the upper part of the pressure column; namely, the one fraction through the head as an azeotrope of cyclohexane and benzene and the other as a side stream which contains the main amount of the benzene in addition to some cyclohexane. This side stream can then be treated in a secondary column by separating cyclohexane or a cyclohexane-benzene azeotrope and again returning the latter into the pressure column. The secondary column then produces as bottom produce a very pure benzene which is removed from the process. This operating method produces a very pure benzene which can have a melting point up to 5.42° C.

If extreme requirements are placed on the purity of the benzene, another modification of the process conforming to the present invention is more advantageous. This modification consists in withdrawing from the upper part of the pressure column only a head product, and no side stream.

This head product contains the main amount of the benzene as well as all the impurities which were not enriched in the sump of the column, and it is separated in a second column, which is under a pressure no greater than normal pressure, such as normal or reduced pressure and at temperatures which are adapted to the particular pressure, into two fractions, one of which is a head fraction that contains the main amount of cyclohexane in addition to slight amounts of benzene whereas the other fraction is a sump fraction that is very pure benzene with a melting point considerably above 5.4° C., for example, 5.48° C.

An absolute pressure of about 400 mm. mercury has been indicated as especially suitable for the second column; the head temperature should then amount to only 50° C. and the sump temperature to about 58° C. However, a higher absolute pressure can also be selected. The selection of the pressure is determined by the reflux ratio which it is desired to use for this column. Moreover, the increase of the absolute volume of vapor with decreasing absolute pressure is a natural limit for an additional reduction of the pressure.

Both columns are operated under recycle conditions in known manner. A reflux ratio between 1:2.5 to 1:5 has been found as satisfactory for the pressure column. The reflux is produced from the top vapors of the pressure column so that a part of these vapors is cooled and condensed in indirect heat exchange with the sump product of the second column and/or the freshly supplied starting material. The other portion of the top vapors of the pressure column, preponderantly in vaporous form, is flowed over into the second column.

A reflux ratio of 1:300 to 1:1000 is advantageous for the column operating at reduced or normal pressure.

The process of the invention is not limited to a starting material which contains benzene and from which the other higher boiling aromatics already have been separated by a preliminary distillation. On the contrary, the starting material for the process of the invention can also contain aromatics boiling at higher temperatures than benzene, especially toluene and xylene, in addition to benzene and the cited non-aromatics.

The process is illustrated in more detail in the drawing by means of a flow diagram and actually for a case in which only one vaporous fraction is withdrawn as head product from the pressure column and this fraction is then again processed in a column under reduced pressure. The cited figures refer to the processing of one [metric] ton of benzene per hour. The starting material, a redistilled benzene, has a melting point of 5.22° C. and still contains 0.1% by weight cyclohexane and 0.5% by weight n-heptane in addition to benzene. The benzene flows from storage tank 1 at a preheated temperature of about 100° C. through line 2 into heat exchanger 3 where it absorbs heat from the vapors of distillation column 4 with condensation of these latter vapors. The benzene then flows at a temperature of about 145° C. through line 5 into a heater 6 which it leaves at a temperature of 154° C. The benzene then enters pressure column 4 which is under an excess pressure of 5 atmospheres. Column 4 is heated by boiler 7 through which a part of the bottom product is circulated. The temperature of the bottom of the column amounts to about 160° C. The sump product is cooled in cooler 8 and is then withdrawn through line 9. It consists of 23.1 kg. per hour of discharge, of which 4.1 kg. are n-heptane and 19 kg. are benzene.

The top of column 4 is maintained at about 152° C. The mixture of vapors leaves the column through line 10 and is flowed in part by line 11 through a heat discharger 3 acting as a condenser, and heat exchanger 12; a practically complete condensation occurs thereby. The condensate is collected in tank 13 and is returned through line 14 as recycle in an amount of 2.9 [metric] tons per hour and at a temperature of about 65° C. to the pressure column 4.

The other partial stream of vapors from the pressure column flows through line 10a and line 15 into distillation column 16 which is at a pressure not greater than normal, such as either under normal or reduced pressure. The apparatus in the flow diagram is illustrated for the case in which a reduced pressure prevails in column 16, for example a pressure of 400 mm. mercury. In order to produce this reduced pressure, the mixture of vapors flowing through line 10a is expanded in jet nozzle 17, and residual vapors are continuously drawn off by suction through line 18 from condensate collecting tank 19 connected to column 16 in such an amount that the desired reduced pressure is established. Should column 16 be operated under normal pressure, which will be possible in many cases, the jet nozzle 17 and line 18 can be omitted. In place of this, only a vacuum pipe needs to be provided on condensate collecting tank 19.

The head product of pressure column 4 is supplied to column 16 in an amount of 976.9 kg. per hour. The tail product of column 16 is circulated through heat exchanger 12 and is maintained thereby at a temperature of about 58° C. The head temperature amounts to 50° C. From the bottom of column 16 there is discharged through line 20 a very pure benzene in an amount of 974.9 kg. per hour, which contains less than 0.01% cyclohexane (0.09 kg.) and less than 0.1% n-heptane (0.8 kg.). The melting point of this very pure benzene is 5.48° C.

The mixture of vapors leaving column 16 is flowed through line 21 into condenser 22 where a complete condensation occurs. The condensate is in part refluxed by line 23 to the head of column 16, namely in an amount of about 1000 kg. per hour. A forerunnings which amounts to about 2 kg. per hour and consists of half cyclohexane and half benzene is withdrawn from the condensate collecting tank 19 through line 24.

What is claimed is:

1. A process for the purification of crude benzene which contains non-aromatic hydrocarbons, especially n-heptane and cyclohexane as impurities by means of distillation, comprising: separating the crude benzene in a first distillation column at a pressure of about 5 atmospheres into a first sump product at a temperature of about 160° C. containing the main amount of n-heptane in addition to a small amount of benzene and into a first head product at a temperature of about 150° C. containing the main amount of benzene and cyclohexane, withdrawing said first head product and separating the latter in a second distillation column under an absolute pressure of about 400 milliliters of mercury into a second head product at a temperature of about 50° C. which contains the main amount of the cyclohexane in addition to small amounts of benzene and into a second sump product at a temperature of about 58° C., recovering said sump product as pure benzene with a melting point above 5.4° C., and using the energy of expansion of said first head product to create a vacuum to attain the lower pressure in said second column.

2. A process for purification of crude benzene which contains non-aromatic hydrocarbons, especially n-heptane and cyclohexane, and aromatic hydrocarbons boiling at a higher temperature than benzene including toluene and xylene as impurities by means of distillation, comprising: separating the starting material in a distillation column at a pressure between 2 to 20 atmospheres into a first sump product containing the main amount of n-heptane in addition to a small amount of benzene and a first head product containing the main amount of benzene and cyclohexane, withdrawing said first head product from the pressure column, separating the said head product in a second column, under subatmospheric pressure into a further head fraction which contains the main amount of the cyclohexane in addition to small amounts of benzene, and into a further sump product as very pure benzene with a melting point above 5.4° C.

References Cited in the file of this patent

UNITED STATES PATENTS

| | | |
|---|---|---|
| 2,391,576 | Katz et al. | Dec. 25, 1945 |
| 2,476,206 | McCants | July 12, 1949 |
| 2,509,136 | Cornell | May 23, 1950 |
| 2,618,591 | Anderson | Nov. 18, 1952 |
| 2,789,087 | Cines | Apr. 16, 1957 |
| 2,909,576 | Fenske et al. | Oct. 20, 1959 |
| 2,935,451 | Troyan | May 3, 1960 |